United States Patent [19]

Paquette et al.

[11] Patent Number: 4,647,067
[45] Date of Patent: Mar. 3, 1987

[54] VEHICLE SUSPENSION

[76] Inventors: Daniel Paquette; Réal Paquette, both of 480 Principale Street, St-Basile-le-Grand, Quebec, Canada, J0L 1S0; Roger Paquette, 756 Sainte-Rose St., Laprairie, Quebec, Canada, J5R 1Z6

[21] Appl. No.: 720,629

[22] Filed: Apr. 8, 1985

[51] Int. Cl.[4] ............................................. B60G 5/00
[52] U.S. Cl. ..................................... 280/676; 280/690
[58] Field of Search .................. 280/701, 112 A, 104, 280/6.11, 676, 685, 690; 180/72

[56] References Cited

U.S. PATENT DOCUMENTS

| | | | |
|---|---|---|---|
| 1,978,498 | 10/1934 | Littman | 280/104 |
| 2,417,019 | 3/1947 | Sherman | 280/112 R |
| 2,473,519 | 6/1949 | Gillitzer | 280/112 R |
| 3,175,637 | 3/1965 | Honda | 180/72 |
| 3,266,815 | 8/1966 | Bishop | 280/104 |
| 3,313,555 | 4/1967 | Reimer | 280/104 |
| 3,504,928 | 4/1970 | Reimer | 280/104 |
| 3,583,727 | 6/1971 | Wallis | 280/112 A |
| 3,584,892 | 6/1971 | Moore | 280/104 |
| 3,917,306 | 11/1975 | Madler et al. | 280/104 |
| 4,003,443 | 1/1977 | Boughers | 180/72 |

FOREIGN PATENT DOCUMENTS 1162148 9/1958 France .......................... 280/112 A Primary Examiner—John J. Love
Assistant Examiner—Ross Weaver

[57] ABSTRACT

The suspension includes a pair of arms independently pivoted to opposite sides of the vehicle chassis at one end for up-and-down movement, each arm rotatably carrying a ground-engaging wheel of the vehicle at its free end. Each arm extends in the same direction from its pivoted end, longitudinally of the chassis. A compression spring contacts and upwardly extends from each arm at a distance from its pivoted end, and a load transfer lever is fulcrumed at its center to the chassis; extends transversely of the latter; and its outer ends overly and contact the top of the respective compression springs. The suspension system is applicable to three- and four-wheel motor vehicles. Preferably, the arms are hollow and serve to house part of a transformation mechanism to the wheels, the latter being the driving wheels. In a four-wheel vehicle in accordance with the invention, there is further provided an additional load transfer lever disposed on each side of the vehicle chassis and extending longitudinally of the same, with their ends underlying and having a slidable connection with the first-named transfer levers adjacent the springs.

2 Claims, 16 Drawing Figures

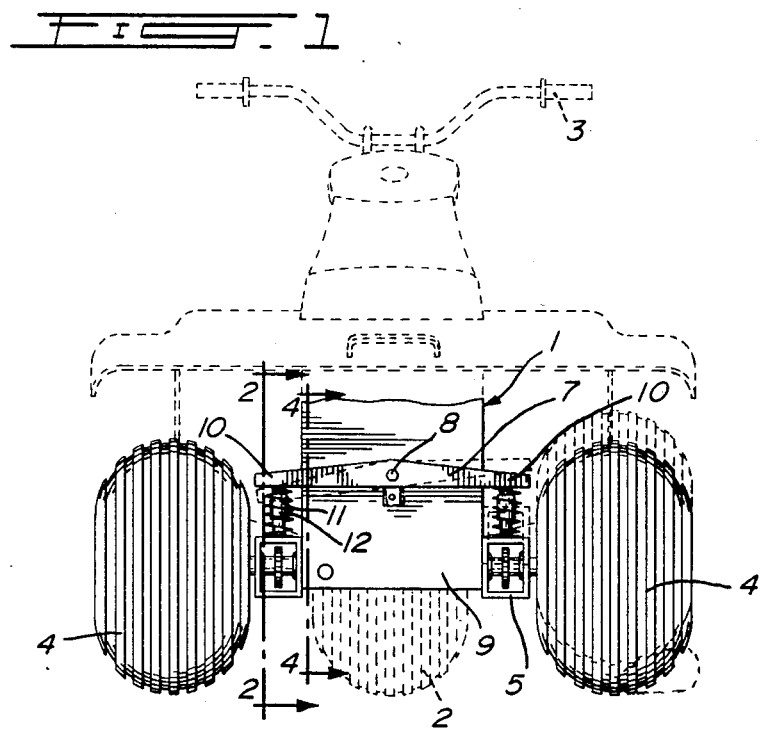
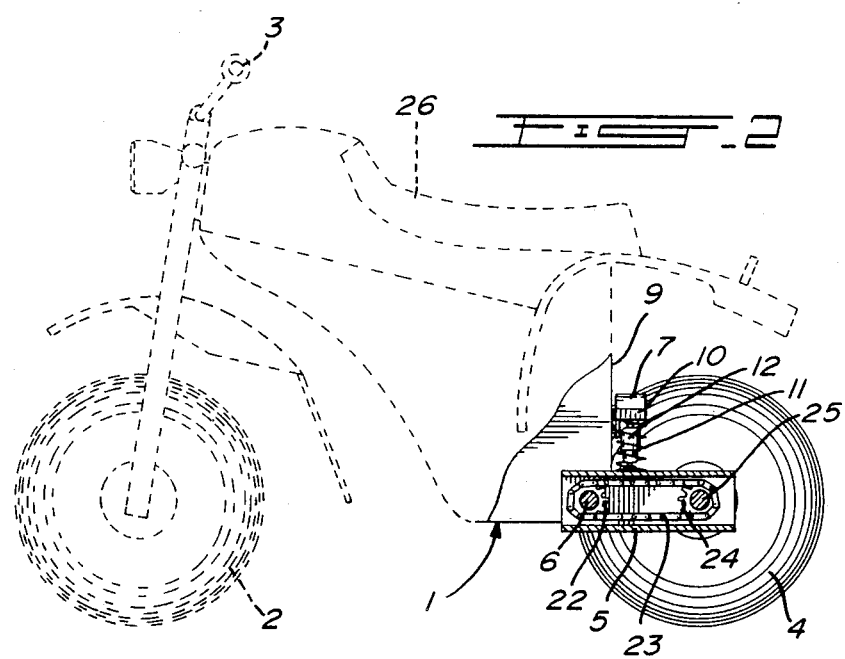

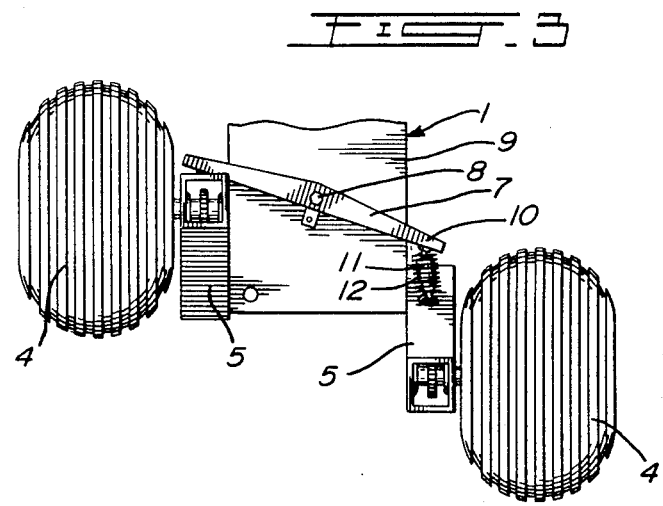
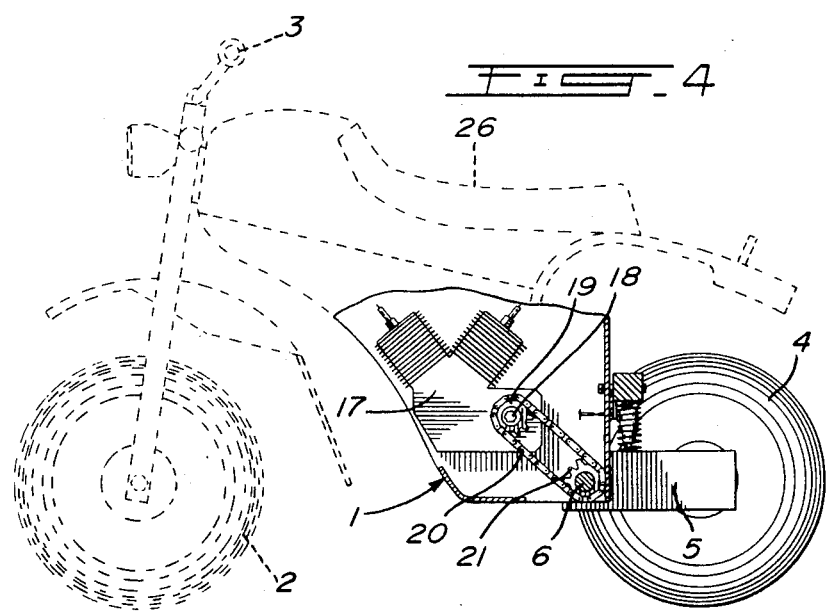

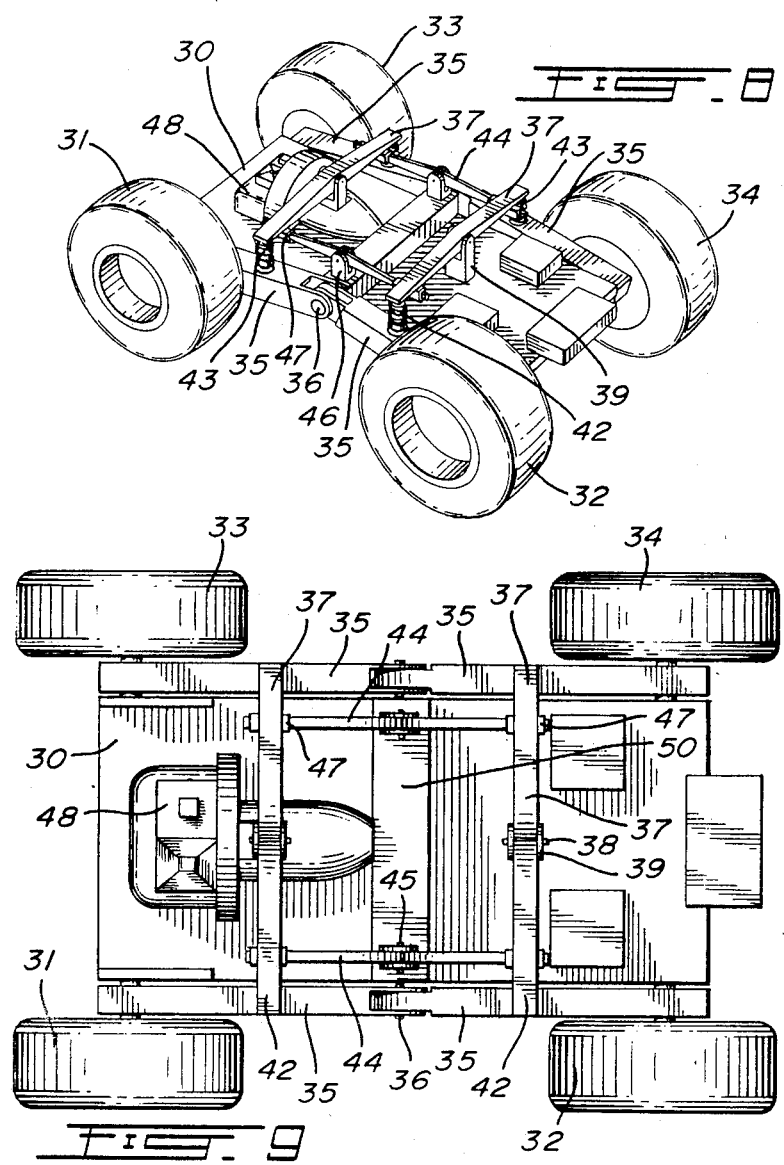

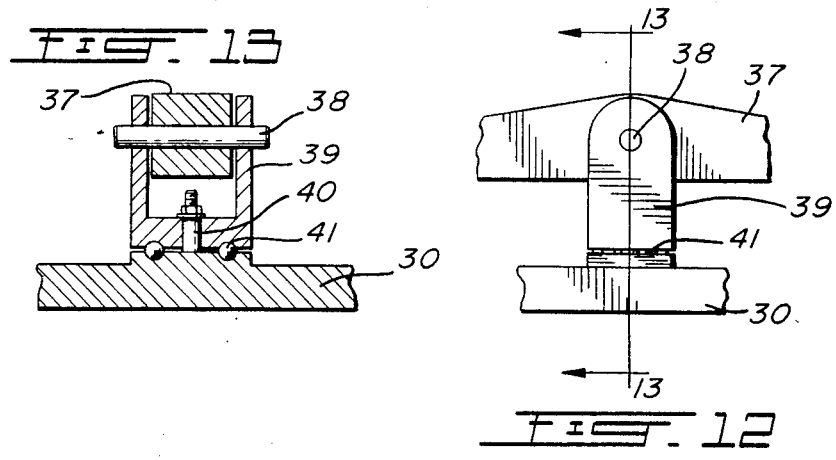
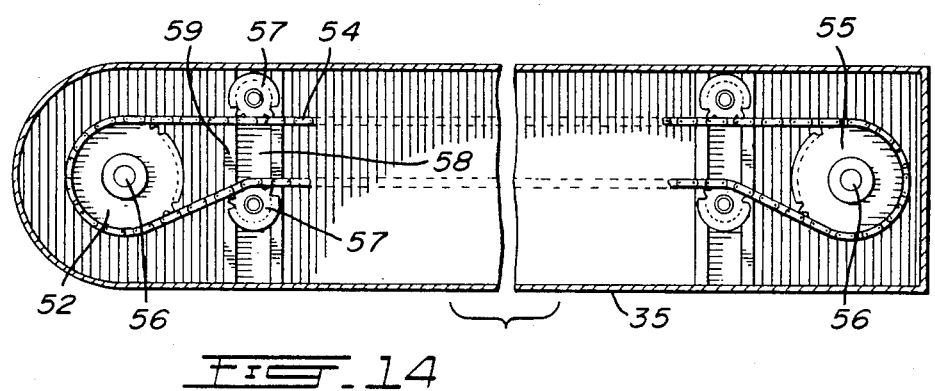
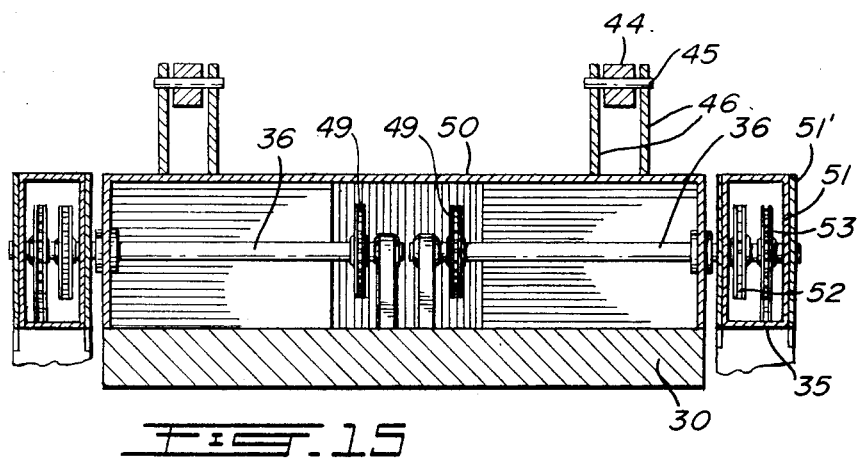

4,647,067

VEHICLE SUSPENSION

FIELD OF THE INVENTION

The present invention relates to vehicle suspensions and, more specifically, to such suspensions which enable the vehicle to negotiate very rough and uneven ground.

BACKGROUND OF THE INVENTION

Tandem wheel arrangements for motor vehicles are known. However, the extent to which said vehicles can negotiate uneven ground, is limited. U.S. Pats. Nos. 2,417,019 and 2,473,519 describe vehicle suspensions for four-wheel vehicles in which each wheel is rotatably carried by the outer end of an arm, the other end of which is pivoted to the vehicle chassis. However, in these patents, each front wheel as well as each rear wheel are not independently sprung with respect to each other, but are connected by a common shaft. Therefore, the ability to negotiate very rough ground is again limited.

OBJECTS OF THE INVENTION

It is a general object of the invention to provide a vehicle suspension which enables the vehicle to negotiate highly uneven ground.

Another object of the invention is to provide a vehicle suspension in which the vehicle chassis will remain substantially level while negotiating uneven ground.

Another object of the invention relates to a vehicle suspension of the character described, which is of simple and relatively inexpensive construction.

SUMMARY OF THE INVENTION

The vehicle suspension of the invention includes, for each pair of wheels disposed on opposite sides of an elongated vehicle chassis, a pair of arms independently pivoted to opposite sides of a chassis at one end for up-and-down movement, and each arm rotatably carrying one of the vehicle wheels at the other end, each arm extending in the same direction from its pivoted end longitudinally of the chassis, a compression spring means being provided contacting and upstanding from each arm at a distance from its pivoted end. A first load transfer lever is centrally, freely fulcrumed to the chassis and extends transversely of the latter, with its outer ends overlying and contacting the top of the respective compression spring means. The vehicle may be a motor vehicle and the wheels driven, for instance, by a hydraulic motor carried by the outer end of each arm and connected to the wheel. As an alternative, the chassis-mounted motor may have a mechanical transmission to the driving wheels, in which case the arms are hollow to house a part of this mechanical transmission.

The suspension system of the invention is applicable to a three-wheel motor vehicle, in which the driving wheels are mounted at the end of a pair of arms at the back of the vehicle, the remaining wheel being centrally mounted at the front of the vehicle and being steerable. The suspension system is also applicable to a four-wheel vehicle, motorized or not, and also to any vehicle having an even number of wheels disposed on each side of the vehicle. In such vehicles, the arms for each group of two wheels on the same side of the vehicle are oppositely directed longitudinally of the vehicle and are pivoted to the vehicle chassis at a common pivotal axis. Furthermore, there is provided a second load transfer lever, one on each side of the chassis, and extending longitudinally of the same, these second load transfer levers being centrally freely fulcrumed on the chassis with their outer ends underlying the first load transfer levers and having a slidable connection therewith adjacent the compression spring means.

BRIEF DESCRIPTION OF THE DRAWINGS

In the annexed drawings:

FIG. 1 is a rear end view of a three-wheel vehicle provided with the suspension of the invention, in accordance with a first embodiment, the vehicle itself being shown partly in dotted line;

FIG. 2 is a partial section, taken along line 2—2 of FIG. 1;

FIG. 3 is a partial rear end elevation, similar to that of FIG. 1, but showing how the vehicle chassis can stay level on a slope.

FIG. 4 is a partial section, taken along line 4—4 of FIG. 1;

FIG. 8 is a perspective view of a four-wheel vehicle embodying a second embodiment of the suspension system of the invention;

FIG. 9 is a top plan view of the vehicle of FIG. 8;

FIG. 12 is a partial elevation of the central part of a transversely-extending load transfer lever showing its connection to the vehicle chassis;

FIG. 13 is a section taken along 13—13 of FIG. 12;

FIG. 14 is a longitudinal section of the wheel-carrying arms showing the internal transmission mechanism;

FIG. 15 is a cross-section of the vehicle chassis at the level of the pivotal connection of the wheel-carrying arms to the chassis and showing again the internal transmission mechanism.

DETAILED DESCRIPTION OF THE TWO PREFERRED EMBODIMENTS

Figure 5:
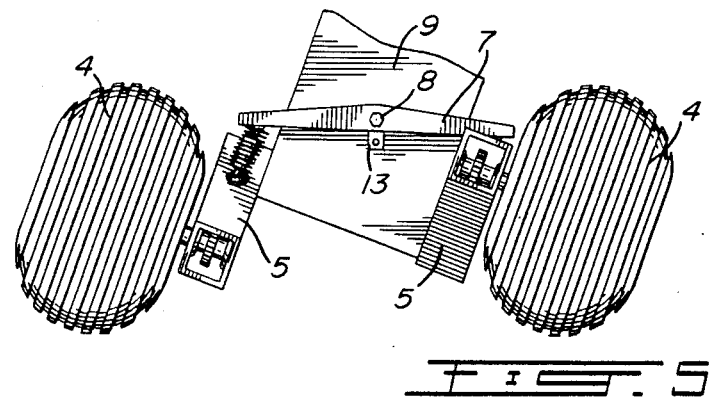
FIG. 5 is a view similar to that of FIG. 3, but showing how the vehicle chassis can tilt to the inside of a turn.

FIGS. 1 to 7 show the first embodiment of the invention, in which the suspension is applied to a three-wheel motor vehicle of the type including a chassis 1, of generally elongated shape, the front of which carries a centrally-mounted single ground-engaging wheel 2, which is steerable by means of handle bars 3. A pair of ground-engaging wheels 4 are mounted on each side of the vehicle chassis at the back thereof. Each wheel 4 is mounted at the outer free end of a suspension arm 5, the other inner end of which is pivoted on the vehicle chassis 1 around a transverse shaft 6. The two suspension arms 5 are directed longitudinally of the chassis in the rearward direction with respect to their pivoted end; are freely and independently movable for up-and-down movement at their pivotal connection to the chassis.

A load transfer lever 7 is freely pivoted about a pivot 8, centrally thereof, at the back of vertical wall 9 of the vehicle chassis 1. Lever 7 is free to pivot in a vertical plane transversely of chassis 1 and its outer ends 10 extend spacedly over an intermediate part of the associated suspension arms 5. A compression coil spring 11 is fixed to and upstands from each suspension arm 5 at a point along suspension arm 5 intermediate the inner and outer ends thereof and contact the underside of the outer end 10 of lever 7, to which it is connected. Preferably, a shock absorber 12 is also arranged in the gap between the lever 7 and suspension arm 5, said shock absorber being disposed within the coil spring 11.

Figure 6:
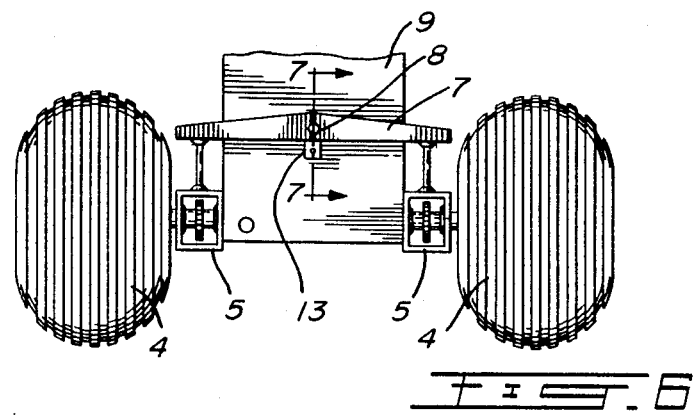
FIG. 6 is a partial view, similar to that of FIG. 1.
Figure 7:
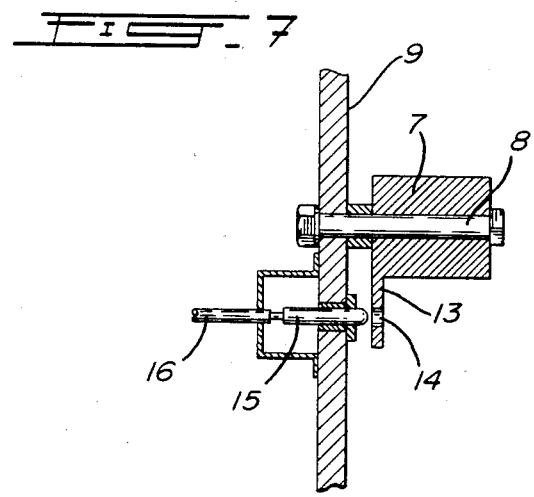
FIG. 7 is a partial section, taken along line 7—7 of FIG. 6.
Figure 10:
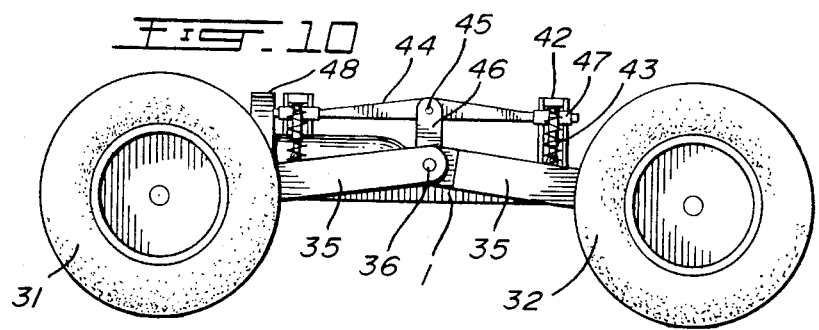
FIG. 10 is a side elevation of the same.

As more particularly shown in FIGS. 6 and 7, means are preferably provided to releasably lock the load transfer lever 7 in horizontal position when the vehicle is level, that is in a plane generally parallel to the main plane of the vehicle chassis 1. These means include a downwardly-extending lug 13 secured to the center of lever 7 and having a hole 14 for receiving a locking plunger 15 slidably carried through the rearward wall 9 and actuated between a locking position in which the plunger 15 engages hole 14 to prevent swinging of lever 7 and unlocking position releasing hole 14 through the intermediary of a flexible cable 16 extending through the chassis and accessible at one of the handle bars 3 to remotely control the locking system.

The vehicle is preferably a motor vehicle, in which case the chassis 1 carries an internal combustion engine 17, as shown in FIG. 4.

Engine 7 has an output shaft 18 which drives each rear wheel 4 by a transmission mechanism, including sprocket wheel 19 fixed to engine output shaft 18; a sprocket chain 20, and a sprocket wheel 21 which is keyed to the transverse shaft 6, common to both wheels 4 extending entirely across the chassis 1. As shown in FIG. 2, each end of the shaft 6, which extends within the associated suspension arm 5, carries a sprocket wheel 22 on which is trained a sprocket chain 23, also trained on a sprocket wheel 24, which is secured to the stub axle 25 to which the wheel 4 is secured. Obviously, the arm 5 is hollow to house the chain 23 and the two sprocket wheels 22, 24. Therefore, each rear wheel 4 is driven by the engine 17 through a transmission system, which extends through each arm 5. The two wheels are yet independently pivoted to the chassis through the associated suspension arm 5. Although the vehicle is a tricycle, it behaves substantially like a motorized bicycle with sprung rear wheels. When negotiating a turn, the rider seated on seat 26, shown in FIG. 4, can cause the vehicle chassis to tilt inwardly of the curve, as shown in FIG. 5. When negotiating a slope or an obstacle on one side of the vehicle, the bicycle rider can maintain the vehicle chassis upright, as shown in FIG. 3.

When one wheel 4 raises with respect to the chassis 1, it causes lever 7 to pivot accordingly and to urge the opposite wheel to move downwardly. All this is accomplished within the range of normal extension and compression of the springs and shock absorbers 11 and 12. The result is therefore that one obtains a relatively large range of up-and-down movement of the respective wheels 4.

FIGS. 8 to 16 inclusive show a second embodiment of the invention with the same suspension principle and applied to a four-wheel vehicle with each wheel motorized. There is shown a flat chassis 30, of generally rectangular shape, provided with four ground-engaging wheels 31, 32, 33, 34. Wheels 31 and 32 are disposed on one side of chassis 30, each rotatably carried by the outer end of a suspension arm 35, the inner ends of which are pivoted to the center of the chassis at a common point through the means of a transverse shaft 36 extending completely through the chassis.

The wheels 33, 34 are disposed on the opposite side of the chassis 30 and are similarly rotatably mounted at the outer ends of respective arms 35, which are also independently pivoted to the chassis by means of the transverse shaft 36.

Arms 35 extend longitudinally of the chassis in pairs and the arms of each pair are oppositely directed from the centrally-located transverse shaft 36. It is supposed that wheels 31 and 33 are the front wheels of the vehicle, while wheels 32 and 34 are the rear wheels. A load transfer lever 37 is associated with the arms 35 carrying the front wheels 31, 33 and a similar lever 37 is associated with the arms carrying the rear wheels 32, 34. Each lever 37 extends transversely of the vehicle chassis 30 and pivoted intermediate its ends at 38 on a bracket 39, which is itself pivoted about a vertical pivot pin 40 (see FIGS. 12 and 13) upstanding from the chassis 30 and provided at the joint with ball bearings 41. Therefore, the lever 37 is free to pivot in a plane normal to the main plane of chassis 30 above said chassis and also to pivot in a plane parallel to that of said chassis.

The outer ends 42 of each lever 37 spacedly overlie an intermediate portion of the suspension arms 35 and a compression spring and, preferably, shock absorber arrangement 43 is disposed within the gap between the outer ends 42 and the arms 35, making a resilient connection between the arms 35 and lever 37.

Pivotal movement of levers 37 about their respective pivot pins 40 allows the spring and shock absorber assemblies 43 to remain substantially normal to the respective arms 35 during the up-and-down movements of said arms.

A pair of additional load transfer levers 44, one on each side of the vehicle chassis 30, are also provided. Each additional lever 44 is centrally pivoted at 45 to an upstanding bracket 46 secured to the chassis 30. The outer ends of each additional lever 44 extend underneath the outer ends of the transverse transfer levers 37 adjacent the associated spring and shock absorber assemblies 43; as shown in FIGS. 8 and 9, the outer ends of the additional longitudinally-extending levers 44 having a sliding connection with the outer ends of levers 37, being slidably inserted in a collar 47 which is in turn pivoted about a vertical axis underneath the lever 37.

Each of the four wheels 31, 32, 33 or 34 can be motorized so as to be driving wheels. For this purpose, each wheel can be driven by a hydraulic motor mounted at the outer end of the respective arms 35, or can be driven through a mechanical transmission connected to the output of an internal combustion engine, schematically shown at 48 in FIG. 9 and mounted on the chassis 30, and having an output shaft connected to a transmission for selectively driving either one of transverse co-axial shafts 36, as shown in FIG. 15 through the sprocket chains and sprocket wheels 49. The two shafts 36 are housed in a transverse box 50 upstanding from the chassis 30, the box serving also as a support for the brackets 46 of the additional load transfer lever 44. As shown in this Figure and also in FIG. 15, each of the two arms 35, on one side of the chassis 30, are interdigitated at their inner end, and the two inner ends 51, 51' are freely pivotally mounted on the same transverse shaft 36. Each arm 35 is of hollow construction; the outer end of each transverse shaft 36 extends within the hollow arms 35 and two sprocket wheels 52, 53 are keyed thereto.

As shown in FIG. 14, a sprocket chain 54 extends within each arm 35, being trained on one of the respective sprocket wheels 52, 53, and is trained at the other end on a sprocket wheel 55, which is keyed to the stub axle 56 of the respective wheels 31 to 34. Therefore, each wheel 31 to 34 can be driven by the central engine 48 and this, while allowing independent pivotal movement of the arms 35. Also, the vehicle can be put in reverse due to the chain-tightening arrangement of FIG. 14. More particularly, the top and bottom runs of the driving sprocket chain 54 is in meshing engagement adjacent each sprocket wheel 52 or 53 and sprocket wheel 55, with two idle sprockets 57 mounted on a common slide member 58 freely slidable and guided in a vertical guide track 59 fixed within the arm 35. The two idle sprockets 57 maintain the sprocket chain 54 in taut condition. In FIG. 14, the top run of the chain is the one under tension, that is it is the driving run, while when the rotational direction of the sprocket 52 or 53 is reversed, the bottom run becomes the driving run and is straightened out while the return top run takes an angular position.

Figure 16:
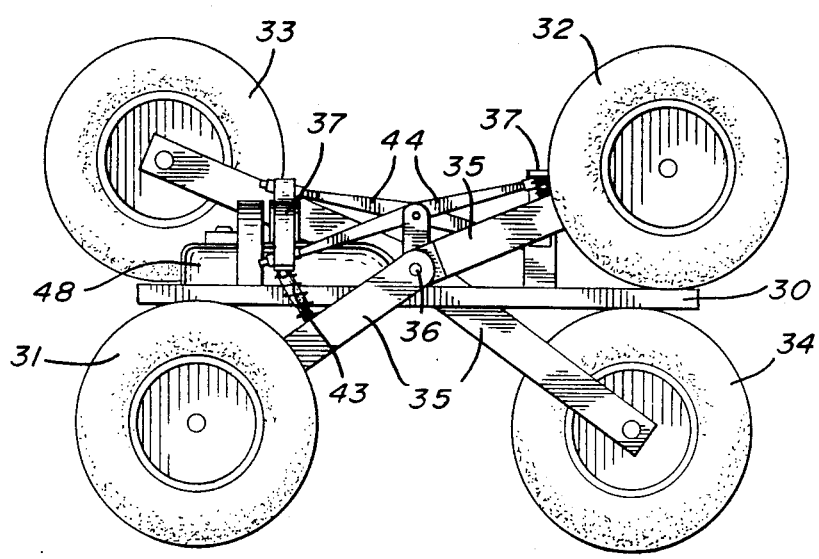
FIG. 16 is a side elevation of the four-wheel vehicle showing how the wheels can negotiate uneven ground.

In accordance with the invention, the suspension is such that the four wheels always remain on the ground, even when negotiating high obstacles and even when one obstacle is on one side of the vehicle and the other on the other side of the vehicle, as diagrammatically shown in FIG. 16.

Yet the chassis 30 remains substantially level. As in the previous embodiment, raising movement of, say, the front wheel 31 on one side of the chassis 30 causes lowering of the front wheel 33 on the opposite side of the chassis through the action of the front load transfer lever 37. The spring and shock absorber assemblies 43 remain within their normal range of extension and contraction, despite large angular movement of the arms 35.

Figure 11:
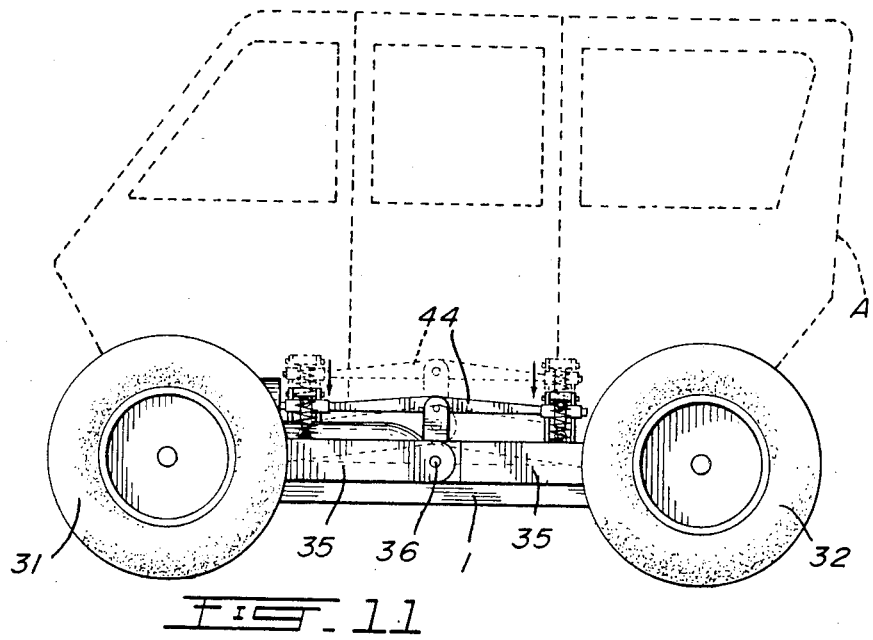
FIG. 11 is also a side elevation of a four-wheel vehicle showing how the chassis is sprung and also showing in dotted line a possible outline of the passenger compartment.

The front-to-back load transfer levers 44 serve to stabilize the chassis 30 in the longitudinal direction, since, when a front wheel moves downwardly, the associated rear wheel will move upwardly. Therefore, with the system of transverse and longitudinal load transfer levers, the vehicle chassis 30, including any passenger compartment A mounted thereon, as shown in FIG. 11, will tilt through a minimum degree both longitudinally and transversely, despite highly-uneven ground.

What we claim is:

1. A suspension for a vehicle having an elongated chassis and two pairs of ground-engaging wheels, the wheels of each pair transversely located on each side of said chassis, said suspension including an assembly for each of said pairs of wheels including a pair of arms independently pivoted to opposite sides of said chassis at one end for up-and-down movement and each arm rotatably carrying one wheel at the other end, the pair of arms of one said assembly being oppositely directed relative to said chassis with respect to the pair of arms of the other said assembly, said arms extending longitudinally of said chassis, a compression spring means contacting and upstanding from each arm at a distance from its pivoted end, a first load transfer lever for each assembly and centrally freely fulcrumed to said chassis and extending transversely of the latter, with its outer ends overlying and contacting the top of the respective compression spring means, said first load transfer levers being substantially parallel and spaced from each other longitudinally of said chassis; and a pair of second load transfer levers centrally freely fulcrumed to said chassis centrally between said first load transfer levers, extending longitudinally of and on each side of said chassis and having their respective outer ends underlying and having a slidable connection with the respective first load transfer levers adjacent said compression spring means.

2. A suspension as defined in claim 1, wherein said vehicle is a motor vehicle and all of said wheels are driving wheels, the arms disposed on the same side of said chassis being pivotally connected to said chassis at a common pivotal connection, each of said arms being hollow, and further including a power transmission for all of said wheels extending from a common source located on said chassis through the common pivotal connections of said arms on each side of said chassis, through the respective hollow arms and to each of said ground-engaging wheels.

* * * * *